Dec. 15, 1925.  1,565,844
H. A. BORRESEN
AUTOMOBILE BUMPER
Filed May 26, 1923  3 Sheets-Sheet 1
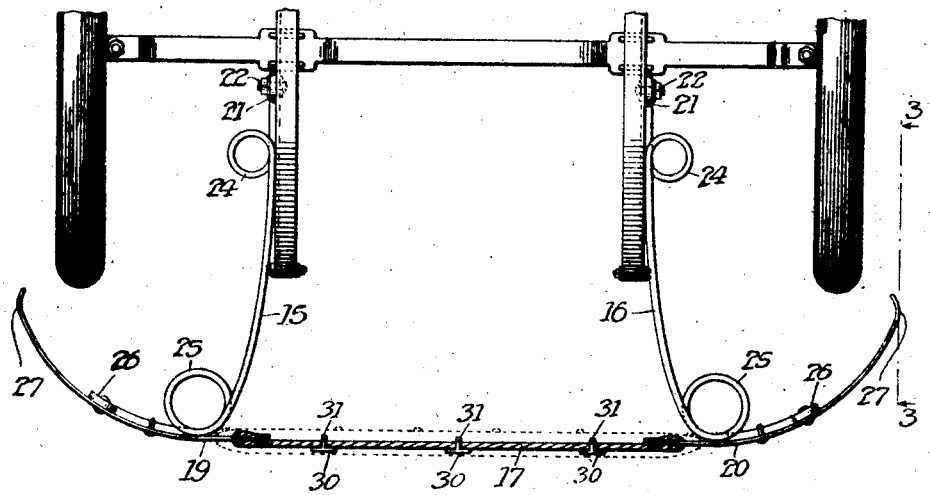
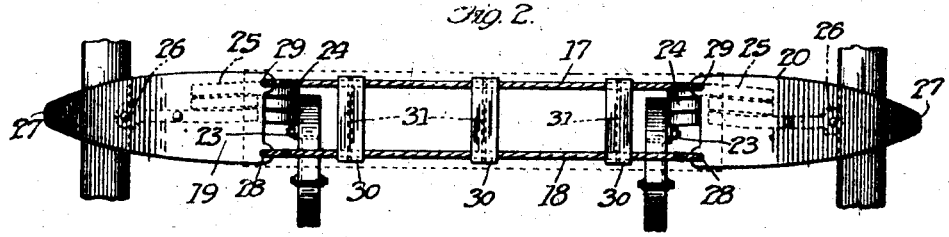
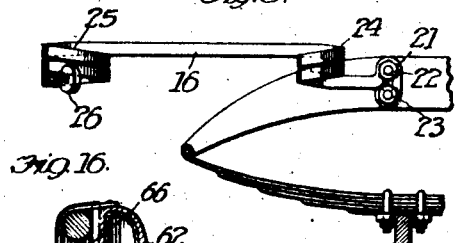
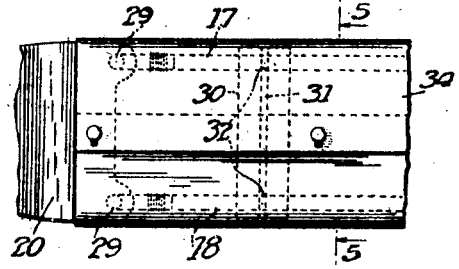
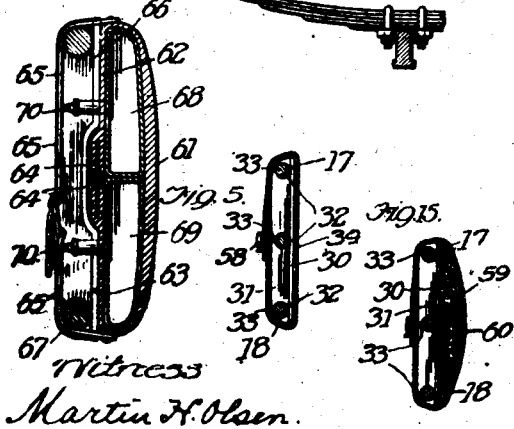
Inventor
Helge A. Borresen.

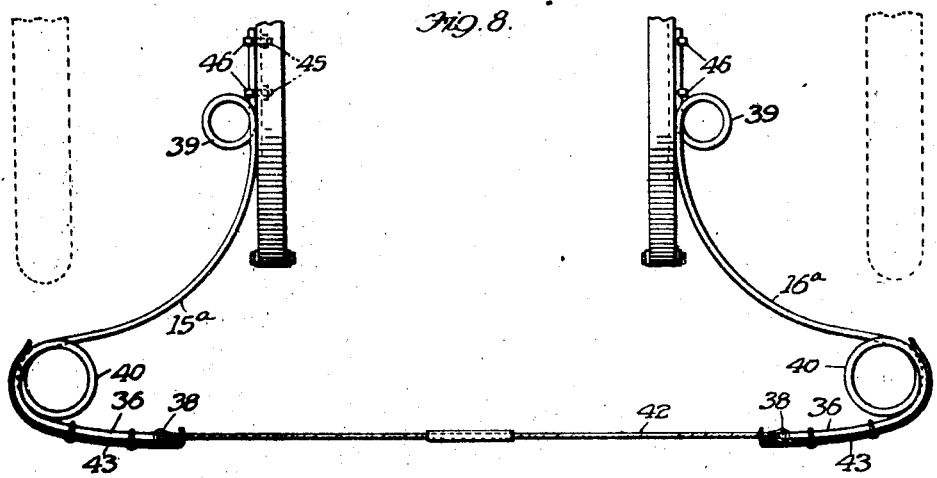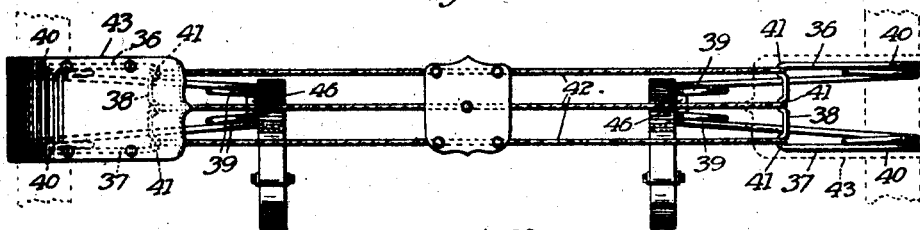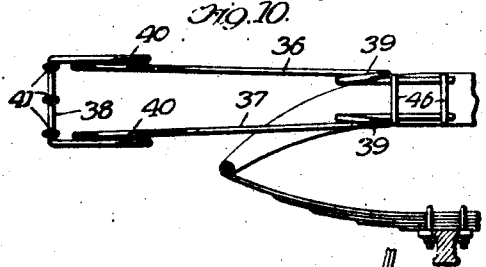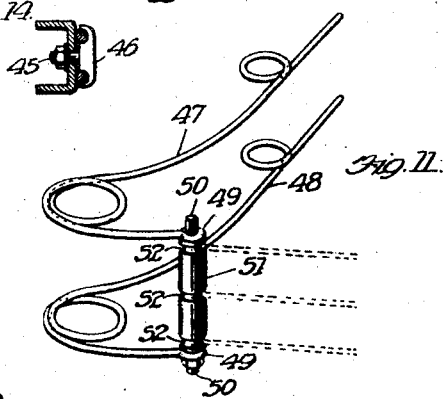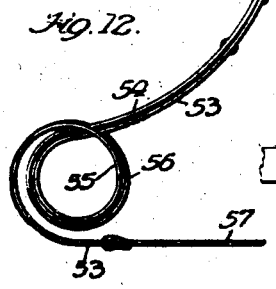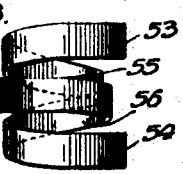

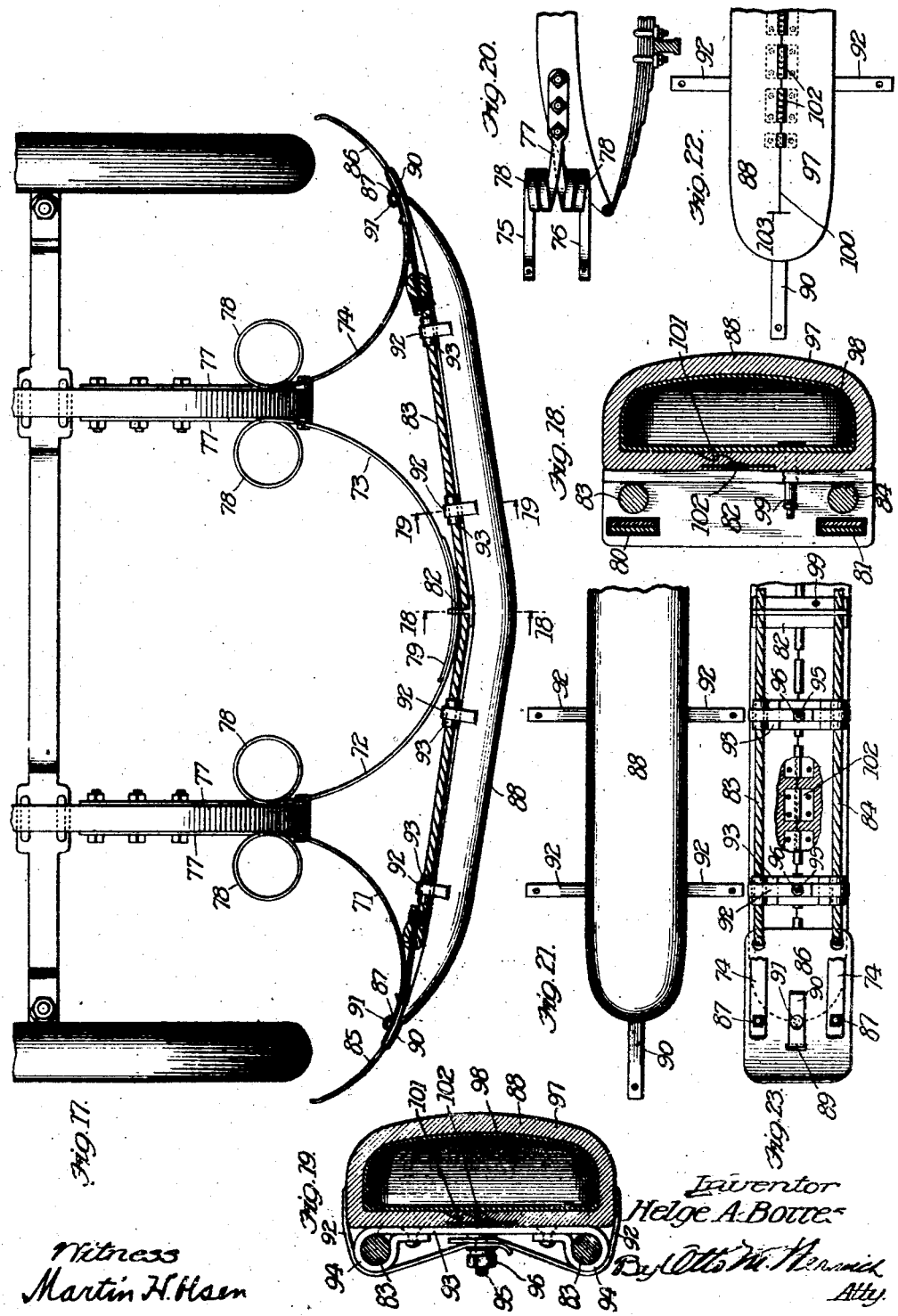

Patented Dec. 15, 1925.

1,565,344

UNITED STATES PATENT OFFICE.

HELGE A. BORRESEN, OF CHICAGO, ILLINOIS.

AUTOMOBILE BUMPER.

Application filed May 26, 1923. Serial No. 641,643.

*To all whom it may concern:*

Be it known that I, HELGE A. BORRESEN, a citizen of the United States, residing at Chicago, in the county of Cook and State of Illinois, have invented a certain new and useful Improvement in Automobile Bumpers, of which the following is a full, clear, concise, and exact description, reference being had to the accompanying drawings, forming a part of this specification.

The invention relates to automobile bumpers and has among its various objects the production of a device of this character in which the element which usually is extended across the vehicle is of a flexible and resilient character.

It is a further object of the invention to combine or associate a support with an element having characteristics such as those above referred to, which support will maintain said element taut, yet will allow said element to yield and be restored upon contact and release of said element with an object.

It is an object to employ a support which extends from the vehicle to the element above referred to, which will yield and resiliently resist various forces applied to it, regardless of the direction of application of said force and be restored to its normal condition after the release of said force.

It is an object to construct the supports of one or more strips which are of a resilient character and to form these strands so that the resilient resistance offered thereby will be increased in proportion to the force applied.

In addition it is an object to provide a member which provides a connector between the resilient supports and the flexible strands which extend across the vehicle and to construct the connector so that it will in addition produce a shield or protector which by virtue of its structure will ward off or deflect an object with which it contacts.

It is a feature of the invention to provide a cover for that portion of the bumper which extends across the end of the vehicle and to construct the cover so that it may be readily associated and removed from said portion of the structure.

It is a feature of the invention to construct this cover so as to provide a cushion to further minimize personal injuries and other damages due to its contact or collision with other objects.

It is an object of the invention to provide an element which is adapted to be secured to a bumper and which is capable of being inflated and to arrange this portion with respect to the bumper so that it will present a cushion to the object with which it engages, the cushion or pneumatic portion including an inner and outer casing, the outer casing having means whereby it may be detachably secured to the framework of the bumper.

The invention will be explained and more readily understood when read in conjunction with the accompanying drawings which illustrate various embodiments of which the invention is susceptible, it being obvious that other modifications may be resorted to without departing from the spirit of the invention as expressed in the appended claims forming a part hereof.

In the drawings Figure 1 is a plan view of a bumper constructed according to one embodiment of the invention.

Figure 2 is a front view of the structure shown in Figure 1.

Figure 3 is a side view of a portion of the structure illustrated in Figures 1 and 2.

Figure 4 is a front view of a portion of a cover which may be employed to enclose a part of the structure shown in Figures 1 and 2.

Figure 5 is a section taken on line 5—5 of Figure 4.

Figure 6 is a perspective view of a connector employed in the arrangement shown in Figures 1 and 2.

Figure 7 is a rear elevation of a portion of the connector illustrated in Figure 6 showing its application to one of the members which extend across the vehicle.

Figures 8 and 9 are respectively plan and front elevations of a modified bumper structure.

Figure 10 is a side view of the structure shown in Figures 8 and 9.

Figure 11 is a perspective view of another form of an element which may be substituted for a portion of the structure shown in Figures 8 and 9.

Figure 12 is a plan view of another embodiment of a structure such as that disclosed in Figure 11.

Figure 13 is a side view of the structure shown in Figure 12. Figure 14 is a sectional view showing the manner in which the bumper may be attached to the frame of the vehicle.

Figures 15 and 16 illustrate various arrangements which may be employed for covering the bumper and providing a cushion to thereby reduce injury to a person and damage to the bumper or object with which the bumper engages.

Figure 17 is a plan view of an end of a vehicle having another form of bumper applied thereto and having another form of pneumatic cushioning structure associated therewith.

Figure 18 is a section taken on line 18—18 of Figure 17.

Figure 19 is a section taken on line 19—19 of Figure 17.

Figure 20 is a side elevation of the structure illustrated in Figure 17 with the pneumatic cushioning element removed.

Figure 21 is a front elevation of a portion of the pneumatic cushion shown in Figure 17 showing means for attaching it to the bumper in extended condition.

Figure 22 is a rear elevation of an end of the structure shown in Figure 21.

And Figure 23 is a rear elevation of a part of the structure shown in Figure 17 having a portion broken away for the purpose of illustration.

The embodiment of the bumper illustrated in Figures 1 to 7 includes the supports 15 and 16 which are connected to the side frames of the vehicle, extend forwardly therefrom and have the cables 17 and 18 secured to their forward ends through the medium of the plates 19 and 20 which in addition to providing a means for connecting said cables to the supports, provide protectors which will ward off or deflect objects which contact therewith.

The object and construction of the supports 15 and 16 being identical with each other an explanation of one will suffice for an understanding of both. These supports 15 and 16 are in the embodiment of the invention illustrated in Figures 1 to 3 constructed of a single strip of suitably shaped spring material, one end being formed with an eyelet 21 whereby the support may be attached to the frame of the machine by means of the bolts 22 and 23.

These supports are each formed to provide the coil 24 which is formed adjacent the point of attachment of the support and frame, and is formed to provide a second coil 25 which is arranged at the forward end of the strip, the end of this portion of the strand being extended outwardly and terminates in an eyelet 26 whereby the curved plate or protector 27 may be riveted or otherwise secured to the resilient member 15 or 16.

In the structure illustrated in Figures 1 and 2 the plate 27 has its innermost end provided with apertures 28 and 29 through which the ends of the cables 17 and 18 are passed and then secured against separation from the plate. The cables 17 and 18 are connected together throughout their length by means of the connectors 30—30 which prevent the separation of said cables and also the passage of an object between said cables. These connectors 30 are in the present instance constructed of T iron, the center rib 31 thereof being provided with a plurality of apertures 32 which are provided to receive the cables 17 and 18. The rib 31 is split at each aperture as indicated at 33 so that the web may be spread at this portion to allow the introduction of the cables into the apertures, it being understood that the split portion of the web is closed after the cables have been located in the apertures.

The structure just described provides an efficient structure for engaging the cable and holding the connectors with relation thereto which prevents the separation of the cables and also prevents the passage of an object between said cables.

In the structure illustrated in Figures 8—9 and 10 the cable supports 15ª and 16ª are composed of a single strip of spring material formed to produce the parallel portions 36 and 37 which are connected together by the element thereof 38 which is integral with the portions 36 and 37. Each of the parallel portions 36 and 37 is formed to provide coils 39 and 40, the former being arranged adjacent the connection of the support and the chassis, the latter being located adjacent the forward end of said supports. The outer extremities of the parallel supports are extended inwardly relatively to the coils 40, thus differing from the structure shown in Figure 1 in which structure this portion of the support extends outwardly. The portion 38 of this structure is notched as indicated at 41 to receive and hold the cables 42—42 in proper relation to this portion of the structure. The device illustrated in Figures 8 and 9 is provided with plates 43—43 which act as shields to ward off or protect the bumper and objects with which this portion of the structure contacts.

These plates 43—43 are connected to the supports by being riveted or otherwise secured thereto and are formed so that they partially encircle both of the coils 40—40. The supports may be secured to the chassis by means of the clip illustrated in Figure 14 which includes a threaded extension 45 which is designed to be passed through an aperture provided in the frame of the machine and provided with a nut which will draw the head 46 of the clip against the ends of the supports and thereby clamp them to the frame of the vehicle.

The construction of the support illustrated in Figure 11 substantially corresponds to the structure shown in Figures 8—9 but differs in that a somewhat different structure is provided whereby the cables which extend across the vehicle are attached to the supports. The structure illustrated in Figure 11 contemplates employing two separate members 47 and 48 which are provided at their outermost extremities with eyelets 49 to secure the reduced ends 50—50 of the element 51, the latter of which is arranged between the members 47 and 48 and is provided with the annular grooves 52 provided to receive and retain said cables in their proper relation to this portion of the structure. The reduced ends 50—50 are threaded so as to receive a nut to thereby hold the supports and the element 51 in associated relation to other portions of the structure.

This arrangement just described provides a convenient structure whereby the element 51 may be replaced or removed should repair become necessary or desirable. The construction of the support illustrated in Figures 12 and 13 contemplates employing two flat spring elements 53 and 54, the ends of which are secured to the chassis or frame of the car, being placed one against the other; and have that portion thereof adjacent the forward end respectively formed to provide coils 55—56 which extend in opposite directions from the part of the support which is secured to the chassis.

The outer extremities of the supports adjacent the coiled portions 55—56 thereof extend inwardly towards the support arranged upon the other side of the vehicle and have the cables 57 attached to said ends.

In Figures 4, 5, 15 and 16 covers for the bumper are illustrated which are provided to enclose said cables of the bumpers, protect them against the weather, improve the appearance thereof and in addition minimize the possibility of injury to a person and damage to the bumper and also the object with which the bumper may be brought into contact.

This cover may be constructed of any desirable or suitable material and is designed to surround the cables throughout their length. The particular structure illustrated in Figure 5 contemplates providing a cover having fastening means 58 provided along its opposite edges. The particular means illustrated is similar to the ordinary glove fastener; however, any other means may be employed to accomplish the purpose.

The structure illustrated in Figure 15 contemplates providing the cover with a pocket 59 within which cushioning material 60 is confined.

In the arrangement illustrated in Figure 16 a pneumatic structure is illustrated which includes an outer cover 61 the ends 62—63 of which overlap each other and in addition are each provided with intercalating portions 64—64 which co-operate with each other to prevent separation of the casing at said edges. The cover in this instance is provided with straps 65—65 for securing it to the bumper. Metallic straps 66 are arranged transversely of the cables 67 and are interposed between the cables and the cover and co-operate to maintain the ends of the outer casing against the action of the pneumatic pressure contained in the tubes 68 and 69, each of which is provided with a valve and valve stem 70 for the purpose of inflating them.

The structure illustrated in Figure 17 includes the use of a plurality of pairs of spring elements 71—72—73 and 74 each pair including elements 75 and 76, as illustrated in Figure 20 which have one end such as 77 attached to the chassis and the other attached to the strands which extend across the end of the vehicle.

Each of the spring elements 75 and 76 is formed to provide a coil 78 which adds to the resiliency of the structure. These spring elements 71, 72, 73 and 74 are preferably curved in the manner illustrated and the ends of the spring elements 72 and 73 overlap each other as indicated at 79 and are passed through apertures 80 and 81 provided in the T shaped member 82 which is arranged transversely of the strands 83—84 which extend across the end of the vehicle and are passed through said member 82.

The strands or cables 83 and 84 have their opposite ends attached to the plates 85 and 86 which are respectively attached to the resilient members 71 and 74 by means of rivets or bolts as indicated at 87. These plates provide guards for the ends of the bumper for the purpose hereinbefore explained and in addition provide a means whereby the opposite ends of the pneumatic cushion generally designated 88 may be removably secured to said bumper. To accomplish the attachment of the cushion or pneumatic portion of the bumper to these plates each of said plates is apertured as indicated at 89 to permit the straps 90, provided at the ends of said pneumatic portion 88, to be passed therethrough and be secured to said plate by some suitable fastener such as 91. The pneumatic cushion 88 is provided with several additional straps 92—92 which extend in opposite directions from the body of said pneumatic portion and are provided for the purpose of assisting in securing this pneumatic cushion to other portions of the structure. These straps are in the present structure designed to have an end thereof secured to the metallic cross members 93 which are disposed at suitable intervals throughout the length of the cables 83 and 84. The opposite ends of these cross members are formed to provide loops 94—94 which surround the cables and secure the cross members to said cables. These cross members are each provided with a threaded projection 95 with which the apertured straps 92 co-operate to assist in holding the cushion 88 with relation to the remainder of the structure, the straps being held with relation to the projection through the medium of the nut 96.

The cushion member 88 is composed of an outer casing 97 and an inner tube 98, the latter being provided with a valve and valve stem 99 whereby the tube may be inflated. The outer casing 97 is constructed so as to completely surround the inner tube and is split as at 100 to permit the introduction and removal of said tube from within the casing. The edges of said outer casing are provided with dual locking means designated 101 and 102. The edges of said split are formed to provide the locking means 101 and each of said edges is further provided with the locking means 102 which are preferably metallic members shaped so as to engage each other and hold the edges against separation but will readily allow the edges to be unlocked and opened to permit the introduction or removal of an inner tube, and in addition allow the rear wall to give upon application of force to bumper.

These locking elements 102 are disposed throughout the length of the casing. The casing is provided with a transverse slit 103 which is provided to facilitate the introduction and removal of the tube from the casing.

By referring to the structure illustrated in Figure 17 it is manifest that should a force be applied to the bumper at or near the center thereof, that the ends of the springs 72 and 73 will slide with relation to each other and will also act in this manner should a force be applied to the endmost springs 85 and 86.

It is further manifest that the pneumatic cushion may be readily changed or be entirely removed should occasion demand either to be done.

It is also evident that the structure will successfully resist pressure within the tube, yet will not interfere with the flexibility of the bumper.

From the foregoing decription of the various structures illustrated it is obvious that an extremely simple and inexpensive construction is provided in which the combination of the resilient spring supporting elements and the flexible members or cables which extend from one support to another co-operate to provide a bumper which is extremely resilient and which will yieldably resist the various forces applied to it, and in which a flexible, cushioned element is presented to the object which will reduce the possibility of personal injury and injury to other objects.

Having thus described the invention what I claim and desire to cover by Letters Patent is:

1. In an automobile bumper the combination of a pair of supports one end thereof being adapted to be secured to a vehicle and having a flexible member secured to the opposite ends thereof and being extended across the end of the vehicle, said supports consisting of resilient material which is formed to produce a coil intermediate its ends.

2. In an automobile bumper the combination of a flexible member adapted to be extended across the end of a vehicle and supporting members to which said flexible member is secured, said supporting members being produced of a member which is of resilient material formed to provide coils, the latter being arranged adjacent the ends thereof to which the flexible member is secured and adjacent the opposite end of said support.

3. In an automobile bumper the combination of a flexible member adapted to be extended across the end of a vehicle and supporting members to which said flexible member is secured, each of said supporting members being produced of parallel members of resilient material, formed to produce a coil arranged intermediate the ends thereof.

4. In an automobile bumper the combination of a flexible member adapted to be extended across the end of a vehicle and supporting members to which said flexible member is secured, each of said supporting members being produced of parallel connected members of resilient material formed to produce a coil arranged intermediate the ends of said parallel members.

5. In an automobile bumper the combination of a flexible member adapted to be extended across the end of a vehicle, members providing supports for said flexible member, and a member provided at the end of said supports to which the flexible member is attached, each of said supports consisting of resilient material which is formed to produce a coil intermediate its ends.

6. In an automoble bumper the combination of a flexible member adapted to be extended across the end of a vehicle, members providing supports for said flexible member, each of said supports consisting of parallel portions formed intermediate its ends to produce a coil, a member arranged at an end of said parallel portions of the support to which the flexible member is attached.

7. In an automobile bumper the combination of flexible members adapted to be extended across the end of a vehicle, resilient supports adapted to be secured to the vehicle and permitting said flexible members to be secured thereto, said supports being formed to provide coils, members connecting said flexible members together to maintain them in parallel relation and to prevent the passage of an object between said parallel flexible members.

8. In an automobile bumper having cables which extend from one side of the vehicle toward the other in combination with a cushion which extends along the cables and in front of said cables.

9. In a device adapted to be extended across the end of a vehicle, said device being separable along its length thereof and having means arranged along the edges thereof which interlock with each other and permit said edges to be separably locked together to provide a pocket in which cushioning means may be confined.

10. A device adapted to be extended across the end of a vehicle, said device being separable along its length and having means arranged along the edges thereof which interlock with each other and permit said edges to be separably locked together to provide a means for receiving a pneumatic cushioning element, said locking means being held in locked relation by the expansion of said cushioning element.

11. A device adapted to be secured to a vehicle and to extend across the end thereof, said device providing a cover for pneumatic cushioning means enclosed by said cover, said cover having means provided along the opposite edges thereof which cooperate with each other whereby the opposed edges thereof are secured against separation and means for securing said device in position.

12. A cushioning member for a bumper consisting of an outer casing, the opposed edges thereof having means which cooperate with each other for securing them against separation, and a pneumatic element confined in said casing.

13. In an automobile bumper the combination of supports, a cable formed of strands extending across the end of the vehicle having its opposite ends attached to said supports, shields arranged exteriorly of said cables provided at the ends of said cable and means for resiliently maintaining said cable in extended condition across the end of the vehicle.

14. In an automobile bumper the combination of supports coiled intermediate their ends and cables extending from one support to the other, said cables being maintained in extended condition by means of said coiled supports.

In witness whereof, I hereunto subscribe my name this 22nd day of May A. D., 1923.

HELGE A. BORRESEN.